United States Patent Office 3,556,855
Patented Jan. 19, 1971

3,556,855
BATTERY WITH A GRID OF METAL COATED FIBRES AND RESIN
Eric Reginald Howells, Runcorn, England, assignor to Imperial Chemical Industries Limited, London, England, a corporation of Great Britain
No Drawing. Filed July 11, 1968, Ser. No. 743,952
Claims priority, application Great Britain, July 19, 1967, 33,230/67
Int. Cl. H01m 35/04
U.S. Cl. 136—65                                8 Claims

ABSTRACT OF THE DISCLOSURE

For use in the plate on an electrochemical cell or battery, a grid at least part of which is shaped from an electrically conductive resinous composition comprising a mouldable resin and metal coated glass fibres. Also, secondary cells and batteries containing such grids.

---

This invention relates to lightweight electrode grids for use in electrochemical secondary cells and batteries.

Electrochemical secondary cells, also known as reversible cells or storage cells, are voltaic cells which are rechargeable by reversal of the electric current. These cells, or assemblies of two or more of them called batteries, are commonly used to provide portable, alternative or emergency sources of direct current electricity. Common applications, for example, are as power providers for starting the internal combustion engines of vehicles, as motive power for electric vehicles such as electric cars and warehouse trucks, and as alternative power supplies for passenger rolling stock on railways (e.g. for lighting and/or air-conditioning).

In most cases, the electrodes, or plates as they are more usually termed, of these secondary cells consist of active materials supported on, or held in contact with, grids. The grid is usually of metal or alloy and serves not only to support the active material but also to conduct the current between the cell terminals and the active material. In most cases the grid also includes a lug, tab or lead which is attached to or made as part of the plate and serves to conduct current to the cell terminals.

In the widely used lead-acid cells and batteries, for example, both the anode and cathode plates comprise lead grids coated with specially formulated pastes based on a mixture of a minor amount of metallic lead and a major amount of lead monoxide. The use of grids is not confined to lead-acid cells and batteries, however. They are also found, for example, in nickel/alkali cells and batteries.

The grids may also take many shapes. For example, in the case of lead-acid batteries used to start petrol-driven vehicles, they usually take the form of a lattice-like framework. In the case of lead-acid batteries used to propel electric vehicles, on the other hand, they often take the form of a row of parallel cylindrical rods attached, generally by their upper ends or top faces, to a common support.

The use of these metal or alloy grids is one of the causes of the high weight of most secondary electrochemical cells and batteries and it is highly desirable to reduce this weight so as to improve the power/weight ratio, particularly where the cells or batteries are used as portable electrical power supplies, e.g. as in electric cars.

According to the present invention, we provide for use in the plate of an electrochemical secondary cell or battery a grid at least part of which is shaped from an electrically conductive resinous composition comprising a mouldable resin and metal coated glass fibres.

We also provide secondary cells and batteries of the kind containing electrode plates comprising active materials supported on or held in contact with grids, wherein one or more of said grids are formed at least in part from the said electrically conductive resinous composition.

The mouldable resin is most suitably a thermosetting or thermoplastic synthetic material or a rubber. Examples of thermosetting materials include phenol-formaldehyde, urea-formaldehyde and amine-formaldehyde resins, and cross-linkable polyester and polyurethane resins. Examples of thermoplastic materials include polyolefins and particularly polyethylene. Others that may be mentioned are poly(methyl methacrylate), polystyrene, polyvinyl chloride, polypropylene, polyisobutylene, acrylonitrile-butadiene-styrene copolymers, polyamides and polyesters e.g. poly(ethylene terephthalate).

The metal coating on the glass fibres may be of any conducting metal with preference for the highly conducting metals. Silver, copper and nickel may be mentioned in particular because they are known to be capable of ready deposition on to glass by electroless plating processes. For example, the glass fibres may be coated with silver using the Brashear process, or with nickel by reduction from a nickel salt using alkali hypophosphite, e.g. as described in United States patent specification 2,935,425, or with copper by the processes described by Weyl and Marboe in "The Glass Industry," volume 26, No. 3 (1945), page 137 onwards, a particularly suitable process being that using Fehling's solution and Formalin. More detailed description of suitable coating methods may be found in the specification of Italian Pat. No. 805,533.

The glass fibres are preferably 2 to 30, and ideally 10–20, microns in diameter and for economic reasons the metal coatings are preferably kept as thin as possible, provided that continuous coatings are obtained. Thicknesses of the order of $\frac{1}{40}$ to $\frac{1}{4}$ micron have been found generally satisfactory. The length of the glass fibres has also been found to have an effect on the conductivity of the resultant compositions. Preferably the average length is at least one millimetre, both in the composition and in the grid shaped from the composition.

The concentration of metal-coated glass fibres in the resinous material is preferably such as to yield an overall resistivity in shapes formed from the composition of not more than about 1.0 ohm cm., and more preferably not more than 0.1 ohm cm. The actual amount needed to achieve this will depend upon the diameter of the glass fibre, the thickness of the metal coating on it and the nature of the metal. In general, however, concentrations of from 10 to 40% by weight, based on the total weight of composition, have been found suitable.

The metal-coated glass fibres may be incorporated into the mouldable resin in a number of ways. For example, where the material is a thermosetting resin, they may be incorporated by placing them in a suitably shaped mould and then covering them with thermosettable pre-polymer syrup which may then be converted to thermoset form. Alternatively, the fibres may be mixed into the syrup.

Except in the case of nickel coated glass fibres where the nickel has been deposited by reduction of a nickel salt by alkali hypophosphite, the best results have been obtained by use of the so-called "dough-moulding" method of premixing. This involves adding a finely divided filler, e.g. calcium carbonate, to a liquid mixture consisting essentially of resin and catalyst to achieve a consistency similar to a baker's dough and then adding the metal coated glass fibres, preferably continuously or in portions e.g. over a period of several minutes to optimise and facilitate homogeneous dispersion, the result being a fibrous putty. Dough-moulding techniques of this kind, which are described in Chapter 4 of "Premix Moulding" by Roger B. White, published by Reinhold, 1964, may be used for example.

The nickel-coated fibres prepared as described above tend to be rather more brittle than the silver- and copper-coated fibres and particular care is needed when mixing them with the resinous material if over-comminution is to be avoided.

In the case of thermoplastic resin or rubber compositions, the fibres may be incorporated, for example, by mixing them with the molten polymer or by slurrying them with finely divided polymer in a liquid vehicle to give a mixture which may then be freed of the liquid and heated to give a coherent mass. To obtain a good dispersion, a preferred method comprises mixing the coated fibres with the thermoplastic material on a heated mill, e.g. a two-roll mill. The temperature and spacing of the rolls should be such as to ensure good mixing but should not over-comminute the fibers and particular care is required with the hypophosphite reduced nickel coated fibres. In particular, it has been found advantageous first to mill the polymer to form a continuous band, then to widen the gap between the rollers sufficient to allow the metal coated glass fibres to be added, preferably all at once, so as to form a loose coating of glass fibres round the polymer band, and then to reduce the gap between the rollers and continue milling until the fibre is well mixed into the polymer, as may be judged by noting the breakdown of the fibrous clumps that are initially formed. The crepe so obtained may then be chopped up to form pellets of suitable size for use in moulding processes.

Alternatively, where the thermoplastic resin is derived from a liquid monomer or mixtures of monomers, a modification of the "dough-moulding" technique mentioned above in respect of the thermosetting resins may be used wherein the monomeric material is mixed with a finely divided filler to yield a dough-like mixture and then the coated glass fibres are added in, if necessary continuously or in small portions over a period of time, to yield a uniform composition. The monomer may then be caused or allowed to polymerise. Suitably, the monomeric material also contains a thermally activated catalyst and polymerisation is readily effected by the application of heat. If desired, the mixture may be shaped before polymerisation is complete.

In the case where the polymer is soluble in the monomer, for example as with methyl methacrylate, the monomer may contain some dissolved polymer if desired, for example to increase viscosity.

Other components may also be included in the compositions, for example heat and light stabilisers, plasticisers, fillers, pigments and lubricants. Uncoated fibrous glass may also be included if desired. As has been stated above, in some circumstances the presence of a finely divided filler is particularly advantageous as it aids uniform dispersion of the glass fibres in the composition.

The resinous fibre-containing compositions may be shaped to form a grid or part thereof by any suitable means. In the case of thermosetting resins, the compositions may be shaped in situ by placing the fibres in a suitable mould and pouring the thermosetting syrup over them. Alternatively, they may be formed from sheet material, e.g. by stamping, cutting and/or milling. In the case of thermoplastic resins, they may be formed conveniently, for example, by injection or compression moulding or by extrusion.

Our invention is not limited to any particular form or shape of grid. On the contrary, it may be applied to any grid of any shape or form which is intended to be used as, or as part of, an electrode of a secondary cell or battery. It will be understood, however, that in the case of grids of very complex shape or structure, it may be necessary to mould them in several parts and then assemble the parts, e.g. in a final moulding operation or by pinning or otherwise holding them together so as to obtain good electrical contact between the parts forming each grid.

The grids formed in accordance with our invention may be used as, or as part of, the electrodes in any secondary cell or battery whose construction requires the use of grid structures, and are by no means confined to the lead-acid and nickel-alkali secondary cells or batteries which have been specifically mentioned in this specification merely by way of suitable illustration and example.

To obtain the greatest advantage from our invention it is preferred that the whole grid is formed of the metal-coated glass fibre/resin composition. This is not to say, however, that useful advantages are not gained from forming only part of the grid from this material. It may also be found convenient to arrange for metal connections to be integrally moulded into the grid, which connections, e.g. tabs or plugs, may be used to form electrically conductive attachments between the grids and other parts of the cell or battery, especially the terminals.

The grids of our invention are particularly suitable for use in the cathodic plates of secondary cells. They may also be used in the anodic plates but these may be more liable to corrosion. The best use may be made of our invention when the grids of all the plates, or at least all the cathodic plates, of the cell or battery are made at least in part from our specified metal-coated glass fibre/resin compositions. For example, in the case of conventional lead-acid starter batteries (used for starting internal combustion engines), a saving in weight of up to 25% may be obtained. However, useful savings in weight may still be obtained if only some of the grids are of this material.

It may sometimes be found desirable to improve the electrical contact between the grids of our invention and the active materials supported on them or held in contact with them. One method of achieving this is to provide the contact surfaces of the grids with an electrically conducting layer, e.g. of polymeric material filled with carbon black or other electrically conducting powder, or of a chemically-resistant metal. An alternative and preferred means of achieving this is to incorporate an electrically conductive powder, e.g. carbon black, into the composition of mouldable resin and metal-coated glass fibres from which the grids are to be formed. Carbon black, at a concentration of about 30 parts per 100 parts of resin by weight achieves the desired effect.

By way of specific example of our invention, a composition was formed by feeding 70 parts by weight of polyethylene chips on to a conventional two roll mill (temperature 130° C./140° C.; speed differential 1.13 to 1) until a continuous band was formed, 30 parts of silver coated glass fibre (diameter of glass fibres 13 microns, length 6.3 mm., thickness of silver coating about 0.08 micron) were then added slowly at about the rate that the polymer would take them up. When all the fibre had been added, milling was continued until a homogeneous mixture was obtained.

This composition, which contained about 2.7% by weight of silver, was then compression-moulded to form a rectangular lattice-shaped grid having overall dimensions of 4 inches by 3½ inches by ⅛ inch thick, one face being blank and the other consisting of a number of cavities each 7/16 inch by 3/16 inch by 1/16 inch deep, the cavities being spaced 1/16 inch apart, there being in all 7 columns of cavities each column containing 16 cavities. The specific resistance of the grid was found to be 0.2 ohm cm.

A conventional lead/lead oxide based paste for a negative plate was then applied to the grid and the resultant structure was used as a negative plate in a conventional lead-acid cell. The plate performed satisfactorily throughout a series of charge/discharge cycles.

If the above lead/lead oxide paste is replaced by a conventional lead oxide-based paste for a positive plate, the resultant structure may also be used as the positive plate.

Electrical contact between the grid and the lead/lead oxide paste may be improved by adding about 20 parts of carbon black to the composition from which the grid is shaped.

What I claim is:

1. An electrochemical secondary cell or battery containing at least one grid at least part of which is an electrically conductive resinous moulding having incorporated therein metal-coated glass fibres which are homogeneously distributed throughout said moulding and wherein the metal coating is continuous and surrounds said fibres.

2. A cell or battery as claimed in claim 1 in which the metal is silver, copper or nickel.

3. A cell or battery as claimed in claim 1 in which the average length of the metal-coated glass fibres is at least one millimetre.

4. A cell or battery as claimed in claim 1 in which the glass fibres are from 2 to 30 microns in diameter.

5. A cell or battery as claimed in claim 1 in which the metal coating is from $\frac{1}{40}$ to $\frac{1}{4}$ micron in thickness.

6. A cell or battery as claimed in claim 1 in which the resinous moulding contains from 10 to 40% by weight of metal-coated glass fibres.

7. A cell or battery as claimed in claim 1 in which the resinous moulding also contains an electrically conductive powder.

8. An electrochemical cell according to claim 1 wherein the grid is the cathodic plate of a secondary cell.

References Cited

UNITED STATES PATENTS

| | | | |
|---|---|---|---|
| 2,847,496 | 8/1958 | Yamaura | 136—55 |
| 2,985,701 | 5/1961 | Brennan | 136—64 |
| 3,046,170 | 7/1962 | Toulmin, Jr. | 161—170 |
| 3,194,684 | 7/1965 | Wells | 136—26 |
| 3,222,149 | 12/1965 | Drummond | 161—175 |
| 3,267,190 | 8/1966 | Malloy | 136—43 |
| 3,351,445 | 11/1967 | Fieldder et al. | 136—27 |

FOREIGN PATENTS

| | | | |
|---|---|---|---|
| 791,108 | 9/1956 | Great Britain | 136—143 |

WINSTON A. DOUGLAS, Primary Examiner

C. F. LeFEVOUR, Assistant Examiner

U.S. Cl. X.R.

136—38